J. ANDERSEN.

BOB SLED.

Reissued Apr. 18, 1916. 14,116.

APPLICATION FILED MAR. 15, 1916.

2 SHEETS—SHEET 1.

WITNESSES

Jas. F. McCathran

H. T. Riley

Jens Andersen, INVENTOR

BY E. G. Siggers

ATTORNEY

THE COLUMBIA PLANOGRAPH CO., WASHINGTON, D. C.

Reissued Apr. 18, 1916.
J. ANDERSEN.
BOB SLED.
14,116.
APPLICATION FILED MAR. 15, 1916.
2 SHEETS—SHEET 2.
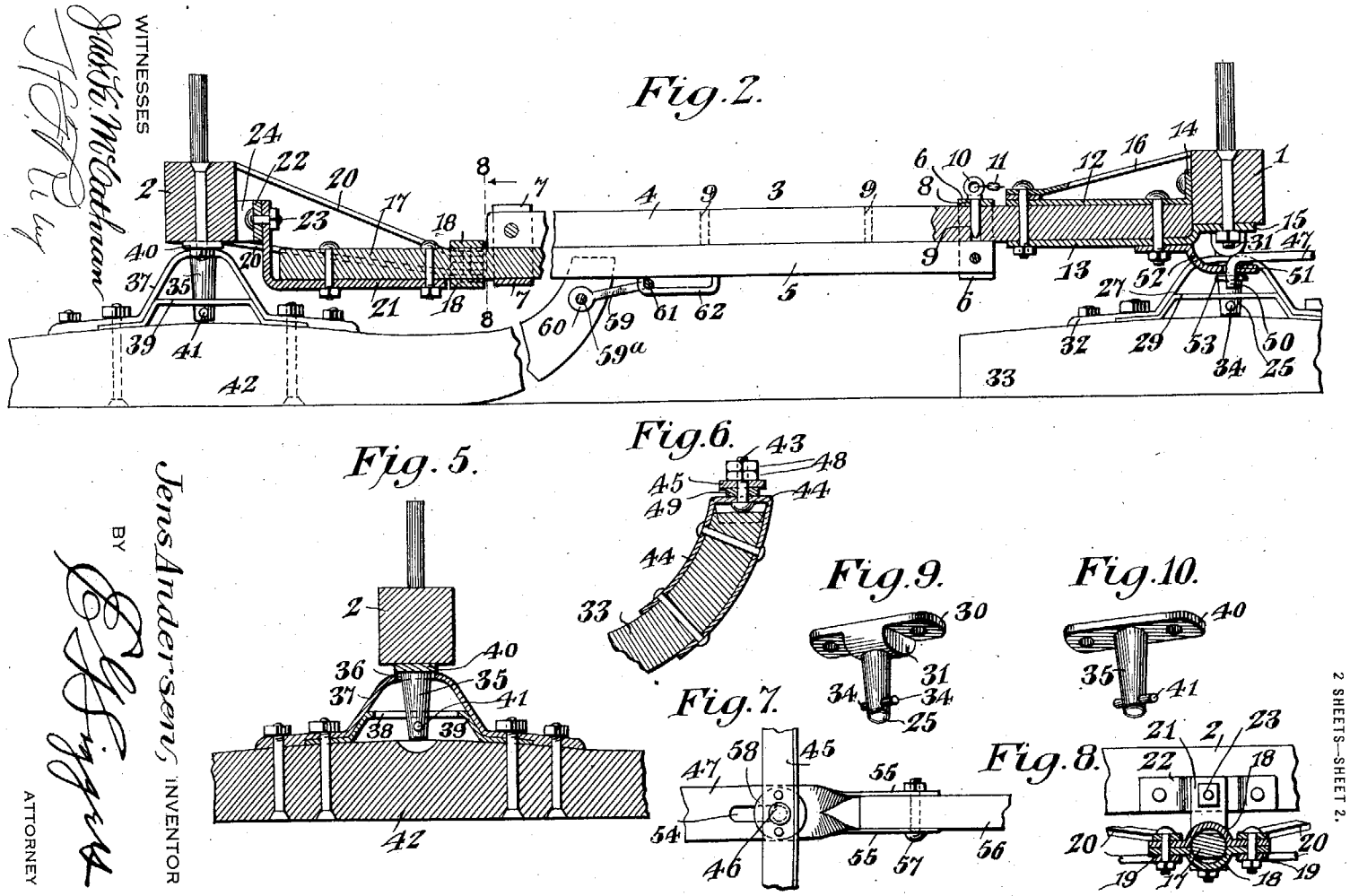
WITNESSES
Jas. E. McCathran
H. C. Ruby
Jens Andersen, INVENTOR
BY E. G. Siggers
ATTORNEY

UNITED STATES PATENT OFFICE.

JENS ANDERSEN, OF BROOKLYN, WISCONSIN.

BOB-SLED.

14,116. Specification of Reissued Letters Patent. Reissued Apr. 18, 1916.

Original No. 1,174,794, dated March 7, 1916, Serial No. 830,557. Application for reissue filed March 15, 1916. Serial No. 84,500.

*To all whom it may concern:*

Be it known that I, JENS ANDERSEN, a citizen of the United States, residing at Brooklyn, in the county of Green and State of Wisconsin, have invented a new and useful Bob-Sled, of which the following is a specification.

The invention relates to improvements in bob sleds.

The object of the present invention is to improve the construction of bob sleds and to provide a simple, practical, and comparatively inexpensive bob sled of strong and durable construction, equipped with runners capable of a free vertical rocking movement in passing over uneven ground.

A further object of the invention is to provide a bob sled having independently movable laterally rocking front and rear bobs and in which the runners of the front bob will be permitted independent horizontal pivotal movement, whereby the bob sled may be easily turned without liability of tipping over.

With these and other objects in view the invention consists in the construction and novel combination of parts hereinafter fully described, illustrated in the accompanying drawing, and pointed out in the claims hereto appended, it being understood that various changes in the form, size, proportions and minor details of construction, within the scope of the claims, may be resorted to without departing from the spirit or sacrificing any of the advantages of the invention.

Figure 1:
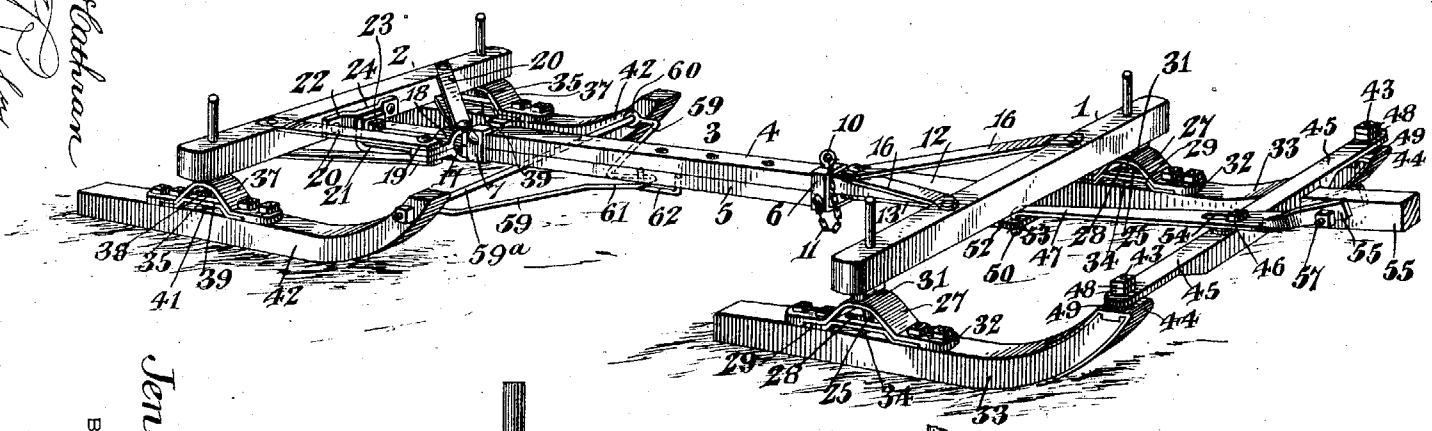
Figure 4:
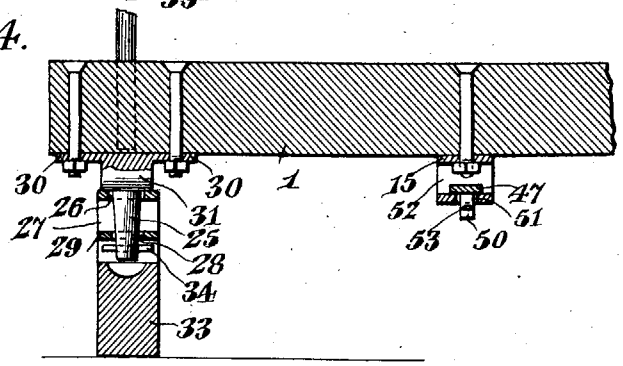
Figure 3:
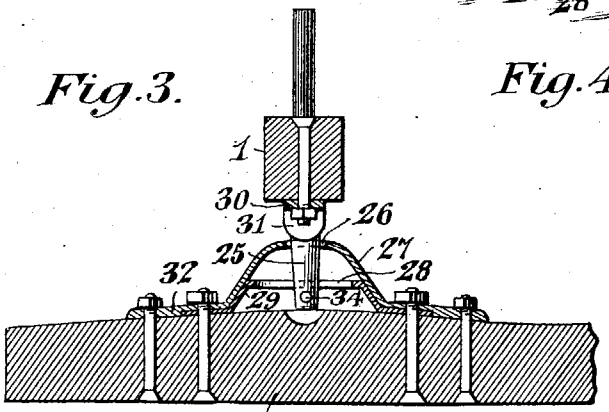

In the drawing: Figure 1 is a perspective view of a bob sled constructed in accordance with this invention. Fig. 2 is a central longitudinal sectional view of the bob sled. Fig. 3 is a vertical longitudinal sectional view illustrating the manner of mounting the front runners. Fig. 4 is a transverse sectional view of the same. Fig. 5 is a longitudinal sectional view illustrating the manner of mounting the rear runners. Fig. 6 is a detail vertical sectional view taken longitudinally of the front portion of one of the front runners. Fig. 7 is a detail reverse plan view of the connection between the central draft bar, the tongue, and the cross bar. Fig. 8 is a detail transverse sectional view on the line 8—8 of Fig. 2, illustrating the construction for connecting the rear end of the reach with the rear bolster. Fig. 9 is a detail perspective view of one of the depending pivots of the front bolster. Fig. 10 is a detail view of one of the pivots of the rear bolster.

Like numerals of reference designate corresponding parts in all the figures of the drawing.

In the accompanying drawing, in which is illustrated the preferred embodiment of the invention, 1 and 2 designate front and rear bolsters connected by a reach 3 composed of front and rear sections 4 and 5, slidably connected with each other by front and rear cuffs 6 and 7. The front reach section 4 is arranged above the upper face of the rear reach section 5 in overlapping relation, and the front cuff 6, which is secured to the front end of the rear reach section 5 by a transverse bolt or other suitable fastening means, loosely embraces the front reach section 4, and is provided at the top with a perforation 8, adapted to register with perforations 9 of the front reach section 4 to enable the reach sections to be adjustably secured by a pin 10. The pin 10 is preferably secured to one end of a chain 11 or other flexible connection, which has its other end attached to a suitable portion of the bob sled. The front reach section 4 is rigidly connected with the front bolster 1 at the center thereof by upper and lower plates 12 and 13, bolted or otherwise secured to the upper and lower faces of the reach section 4, and having their terminals 14 and 15 fastened to the bolster. The front terminal 14 of the upper plate 12 is upturned and fitted against the rear face of the bolster, while the front terminal 15 of the lower plate 13 is secured to the lower face of the front bolster 1, the lower plate being preferably bent upwardly adjacent to the front bolster to arrange the front end 15 in a plane above that of the body portion of the lower plate. The front reach section is also connected with the front bolster by forwardly diverging braces 16, secured at their rear terminals to the upper plate 12 at the rear end thereof and having their front ends attached to the front bolster at opposite sides of the center thereof.

The rear portion 17 of the rear reach section is rounded at the corners and arranged in a bearing collar 18, composed of upper and lower sections which are connected by rearwardly diverging braces 20 with the rear bolster. The rearwardly diverging braces 20 are arranged in pairs and are secured to the upper and lower faces of the rear bolster and have the terminals 19 of the sections of the bearing collar 18 secured between their front ends. The rear portion 17 is equipped with a hanger 21 consisting of a plate secured to the lower face of the said rear portion 17 and provided beyond the same with an upwardly extending arm which is pivoted to a supporting plate 22 by a horizontal bolt 23 which passes through an enlarged opening in the hanger 21 forming a loose connection. The supporting plate 22 is bolted or otherwise secured to the front face of the rear bolster at the central portion thereof, and is provided with a central forwardly extending bend 24 which offsets the pivot bolt 23 from the rear bolster. The pivot bolt 23 is disposed longitudinally of the bob sled and the connections between the arch and the rear bolster permit an axial rotary movement of the reach and a locking movement of the rear bolster. By this construction the front and rear bobs of the sled have an independent lateral rocking movement to enable the bob sled to conform to the configuration of uneven surfaces.

The front bolster is provided at its ends with rigid depending pivots 25 extending through substantially elliptical openings 26 of front knees 27, and having their lower portions operating in longitudinal slots 28 of guides 29. The pivots 25, which taper downwardly, are provided at their upper ends with integral attached plates 30 and having segmental enlargements 31 connecting the pivots with the attaching plates and presenting lower longitudinally disposed convex bearing faces to the knees.

The front knees 27, which are constructed of suitable metal, are arched and have terminal attaching portions 32 which are bolted or otherwise secured to the upper face of front runners 33. The guides 29 each consist of a plate, arched between its ends to provide an intermediate guiding portion located within the arch of the knee at a point between the runner and the top of the arch, and extending from the front to the rear side thereof, as clearly shown in Fig. 3 of the drawing. The front pivot extends through the longitudinal slot of the guide and is provided below the same with a transverse perforation for the reception of a key 34 or other suitable fastening device, for retaining the pivot in the opening of the knee and the slot of the guide. The intermediate portion of the guide is approximately horizontal, and the terminal portions of the guide are fitted against the end portions of the knee, and are secured between the same and the upper face of the runner. The depending pivots of the front bolster are kept in the slots 28 during the vertical rocking movement of the front runners, which are also permitted a horizontal pivotal movement independently of the front bolster to enable the bob sled to be easily turned. The rear bolster is provided with depending pivots 35 tapered downwardly and extending through substantially elliptical openings 36 of rear knees 37, and having their lower portions operating in longitudinal slots 38 of guides 39. The pivots 35 are provided at their upper ends with integral attaching plates 40, which are bolted or otherwise secured to the lower face of the rear bolster. The knees 37 and the guides 39 are constructed substantially the same as the front knees and front guides, and the lower ends of the pivots 35 are provided with retaining pins or keys 41, located at the spaces between the intermediate portions of the rear knees and the rear runners 42.

The front runners are provided at their front terminals with vertical pivots 43 extending upwardly from metallic caps 44 piercing the terminals of a transverse connecting bar 45, which is centrally connected by a bolt 46 with a central draft bar 47. The metallic caps 44 are constructed of strap metal or other suitable material and embrace the upper and lower faces and front end face of the front portions of the front runners. The connecting bar 45 is retained on the pivots by nuts 48 arranged in pairs and mounted on threaded terminal portions of the pivots, spacing members 49 being interposed between the ends of the runners and the terminals of the transverse connecting bar 45. The central draft bar is provided at its rear end with an integral depending pivot 50 extending through a bearing opening 51 of a link or plate 52, secured to the front portion of the lower plate 13 of the front reach section and bent downwardly to arrange its front portion in a plane below that of the rear portion of the link or plate 52. The front portion of the link or plate 52 is spaced from the front terminal portion 15 of the plate 13 a sufficient distance to enable the pivot 50 of the central draft bar to be readily placed in and removed from the bearing opening 51. The pivot 50 is retained in the bearing opening 51 of the link or plate 52 by a pin or key 53. The central draft bar 47 is provided near its front end with a longitudinal slot 54 to receive the pivot bolt 46, and the front end 55 of the central draft bar 47 is bifurcated and has the rear end of a tongue or pole 56 pivoted in it by a pin or bolt 57. The pivotal connections at the front and rear portions of the central draft bar and at the terminals of the transverse connecting bar are adapted to permit such parts to conform to the lateral or horizontal pivotal movement of the front runners in the turning of the bob sled. The slotted portion of the central draft bar or member 47 is spaced from the transverse connecting bar by suitable bearing disks or plates 58 interposed between the said parts and provided with central openings through which the pivot bolt 46 passes.

The front ends of the rear runners are connected with each other by a relatively heavy transverse rod 59ª, and they are also connected with the reach by a substantially U-shaped connecting rod 59, having forwardly converging sides provided at their rear ends with eyes 60 through which pass the terminal portions of the transverse rod 59ª. The sides of the U-shaped connecting rod 59 are connected at their front terminals by an approximately U-shaped bend 61, which is linked into an oblong eye or loop 62 consisting of a staple secured to and projecting from the lower face of the rear section of the reach at a point in advance of the rear runners. The terminals of the transverse rod 59ª, which pierce the front ends of the runners, may be secured to the same by any suitable means, and the rods 59 and 59ª constitute a pivotal connection between the rear runners and the reach, and permit the necessary rocking movement of the said runners. The linking of the loop 61 into the eye or loop 62 also facilitates free rocking movement of the rear runners.

What is claimed is:

1. A bob sled including a front bolster, front runners, means for connecting the runners to the bolster to permit a vertical rocking movement and a horizontal oscillatory movement independently of the bolster, said runners being provided at their front ends with vertical pivots, a transverse bar connecting the front runners and secured to the same by the vertical pivots thereof, a central longitudinal draft bar pivotally connected at its rear end to the sled centrally of the front bolster and extending therefrom to the transverse bar, a substantially vertical pivot arranged centrally of the transverse bar and connecting the same to the draft bar or member, and a tongue pivotally connected to the draft bar or member by a horizontal pivot, which is independent of the pivot connecting the draft bar or member to the transverse bar.

2. A bob sled including front and rear bolsters, runners supporting the bolsters, a reach connected at its front end with the front bolster, and a hanger loosely connected with the rear bolster and supporting the rear end of the reach.

3. A bob sled including front and rear bolsters, runners supporting the bolsters, a reach connected at its front end with the front bolster, and means for loosely connecting the rear end of the reach with the rear bolster, said means comprising a bearing collar located in advance of the rear bolster and receiving the reach, and bars arranged in pairs and located at opposite sides of the reach and rigidly connected with the collar and with the rear bolster.

4. A bob sled including front and rear bolsters, runners supporting the bolsters, a reach connected at its front end with the front bolster, and means for loosely connecting the rear end of the reach with the rear bolster, said means comprising a hanger secured to the rear end of the reach and having an upwardly extending portion, and a horizontal longitudinally disposed pivot mounted on the rear bolster and connecting the upwardly extending portion of the hanger with the same.

5. A bob sled including front and rear bolsters, runners supporting the bolsters, a reach connected at its front end with the front bolster, and means for loosely connecting the rear end of the reach with the bolster, said means comprising a supporting plate mounted at the rear of the bolster, a hanger pivotally connected with the supporting plate and secured to the rear portion of the reach, a bearing collar receiving the rear portion of the reach at a point in advance of the rear bolster, and means located at opposite sides of the reach for connecting the collar with the rear bolster.

6. A bob sled including a stationary pivot, a runner, a knee carried by the runner and provided with an opening through which the pivot extends, and a guide also carried by the runner and having a longitudinal slot in which the lower portion of the pivot operates, said runner being permitted to rotate and rock with respect to the pivot.

7. A bob sled including a depending pivot, a runner, an arched knee carried by the runner and provided at the top with an opening through which the pivot extends, and a guide consisting of a bar located within the knee in spaced relation with the top of the knee and the runner and provided with a longitudinal slot in which the lower portion of the pivot operates, said runner being permitted a rotary as well as a rocking movement with respect to the pivot.

8. A bob sled including a depending vertical pivot provided at the top with an attaching plate, an arched knee having an opening through which the pivot passes, said knee having terminal attaching portions, an arched guide secured at its ends at the terminal attaching portions of the knee and provided with an intermediate guiding portion, said guiding portion being located at a point between the top and bottom of the knee and provided with a longitudinal slot receiving the lower end of the pivot, and means carried by the pivot and located below the intermediate portion of the guide for retaining the pivot in the opening of the knee and the slot of the guide.

9. A bob sled including a front bolster, front runners pivotally connected with the front bolster and provided at their front ends with metallic caps, vertical pivots piercing the caps and projecting upwardly therefrom, a transverse bar pivotally connected to the ends of the front runners by the said pivots, a longitudinal draft member pivotally connected at its rear end with the sled centrally of the front bolster and extending therefrom to the transverse bar, and a pivot arranged centrally of the transverse bar and connecting the same to the draft member.

10. A bob sled including a bolster, a stationary pivot connected thereto, a runner, and a knee carried by the runner and provided with an opening through which the pivot extends said pivot connecting the knee to the bolster, said runner being capable of an oscillatory movement in a horizontal and vertical plane with respect to the pivot.

11. A bob sled including front and rear bolsters, a reach connecting the bolsters for holding the bolsters stationary, front and rear runners, connections between the runners and the bolsters, said connections permitting a vertical rocking movement and a horizontal oscillatory movement of the said runners, a draft device connected with the front runners and adapted to oscillate the same horizontally for changing the direction of the sled, and means for connecting the rear runners to the reach for holding the same against horizontal oscillatory movement without interfering with the vertical rocking movement of the rear runners.

12. A bob sled including a front bolster and a reach, front runners pivotally connected to the front bolster and having a horizontal oscillatory movement independent of the bolster for changing the direction of the sled, a transverse bar pivotally connected to the front portions of the front runners and located in advance of the front bolster, a link pivotally connected to the reach having an opening in its forward end, and a central longitudinal draft bar or member pivotally connected at its front portion with the transverse bar, said draft bar or member having the inner terminal thereof bent downwardly and received in the opening of the link for forming a pivotal connection between the link and the draft bar.

13. A bob sled including a front bolster and a reach, front runners pivotally connected to the front bolster and having a horizontal oscillatory movement independent of the bolster for changing the direction of the sled, a transverse bar pivotally connected to the front portions of the front runners and located in advance of the front bloster, a link pivotally connected to the reach, a central longitudinal draft bar or member pivotally connected at its front portion with the transverse bar, and means for pivotally connecting said link to the draft bar or member in line with the pivotal connection of the front runners to the front bolster.

14. The combination with front and rear sleds, consisting of bolsters and runners, said runners being loosely connected to the bolsters, of a reach connected to the bolsters, a link or plate connected to the reach, a draft bar pivotally connected at its inner end to the link or plate, and means for pivotally connecting the draft bar to the front runners whereby said runners will move in the same direction upon the movement of the sled.

15. A bob sled, including a front bolster and a reach, front runners pivotally connected with the front bolster, and having a horizontal oscillatory movement independent of the bolster for changing the direction of the sled, a transverse bar connecting the front portions of the front runners and located in advance of the front bolster, a central longitudinal draft member pivotally connected at its rear end with a reach, and provided at its front end with a bifurcated part adapted to receive a tongue, and having a transverse pivot for connecting the tongue to it, and means for pivotally connecting the draft member with the transverse bar.

In testimony, that I claim the foregoing as my own, I have hereto affixed my signature in the presence of two witnesses.

JENS ANDERSEN.

Witnesses:
ALICE M. KINNEY,
ALFRED T. ROGERS.

Copies of this patent may be obtained for five cents each, by addressing the "Commissioner of Patents, Washington, D. C."